US005678194A

United States Patent [19]

Grube et al.

[11] Patent Number: 5,678,194
[45] Date of Patent: Oct. 14, 1997

[54] METHOD FOR PROVIDING GEOGRAPHIC DEPENDENT INSTRUCTIONS TO A USER OF A COMMUNICATIONS UNIT

[75] Inventors: Gary W. Grube, Palatine; Marc C. Naddell, Schaumburg; Mark L. Shaughnessy, Algonquin, all of Ill.

[73] Assignee: Motorola, Inc., Schaumburg, Ill.

[21] Appl. No.: 209,778

[22] Filed: Mar. 10, 1994

[51] Int. Cl.$^6$ ............................................. H04B 7/26
[52] U.S. Cl. ...................... 455/54.1; 455/54.2; 455/56.1
[58] Field of Search .............................. 455/33.1, 33.2, 455/53.1, 54.1, 56.1, 54.2; 342/357, 451, 452, 454, 456; 340/991, 995; 379/58

[56] References Cited

U.S. PATENT DOCUMENTS

| | | | |
|---|---|---|---|
| 4,698,781 | 10/1987 | Cockerell, Jr. | 342/451 |
| 5,189,734 | 2/1993 | Bailey et al. | 455/56.1 |
| 5,214,789 | 5/1993 | George | 455/56.1 |
| 5,235,633 | 8/1993 | Dennison et al. | 455/33.2 |
| 5,423,066 | 6/1995 | Sasuta | 455/54.2 |
| 5,442,805 | 8/1995 | Sager et al. | 455/33.1 |

FOREIGN PATENT DOCUMENTS 404152724  5/1992  Japan ......................................... 379/58

OTHER PUBLICATIONS

Siuru "On-Board Navigation Systems for your Car" Popular Electronics, Jan. 1993, pp. 39–42 and 92.

Primary Examiner—Reinhard J. Eisenzopf
Assistant Examiner—Thanh Le
Attorney, Agent, or Firm—Daniel C. Crilly; Timothy W. Markison

[57] ABSTRACT

Geographic information may be automatically transmitted to communication units (102, 103) by a communication resource controller (101). The communication resource controller (101) upon receiving location coordinates, accesses a data base (124) to determine localized geographic dependent information. Having retrieved this information, the communication resource controller (101) transmits this information to the communication units (102, 103). Upon receipt of this information, the communication units (102, 103) determine whether it is pertinent to them. If the information is pertinent, the communication units (102, 103) display the information.

6 Claims, 2 Drawing Sheets

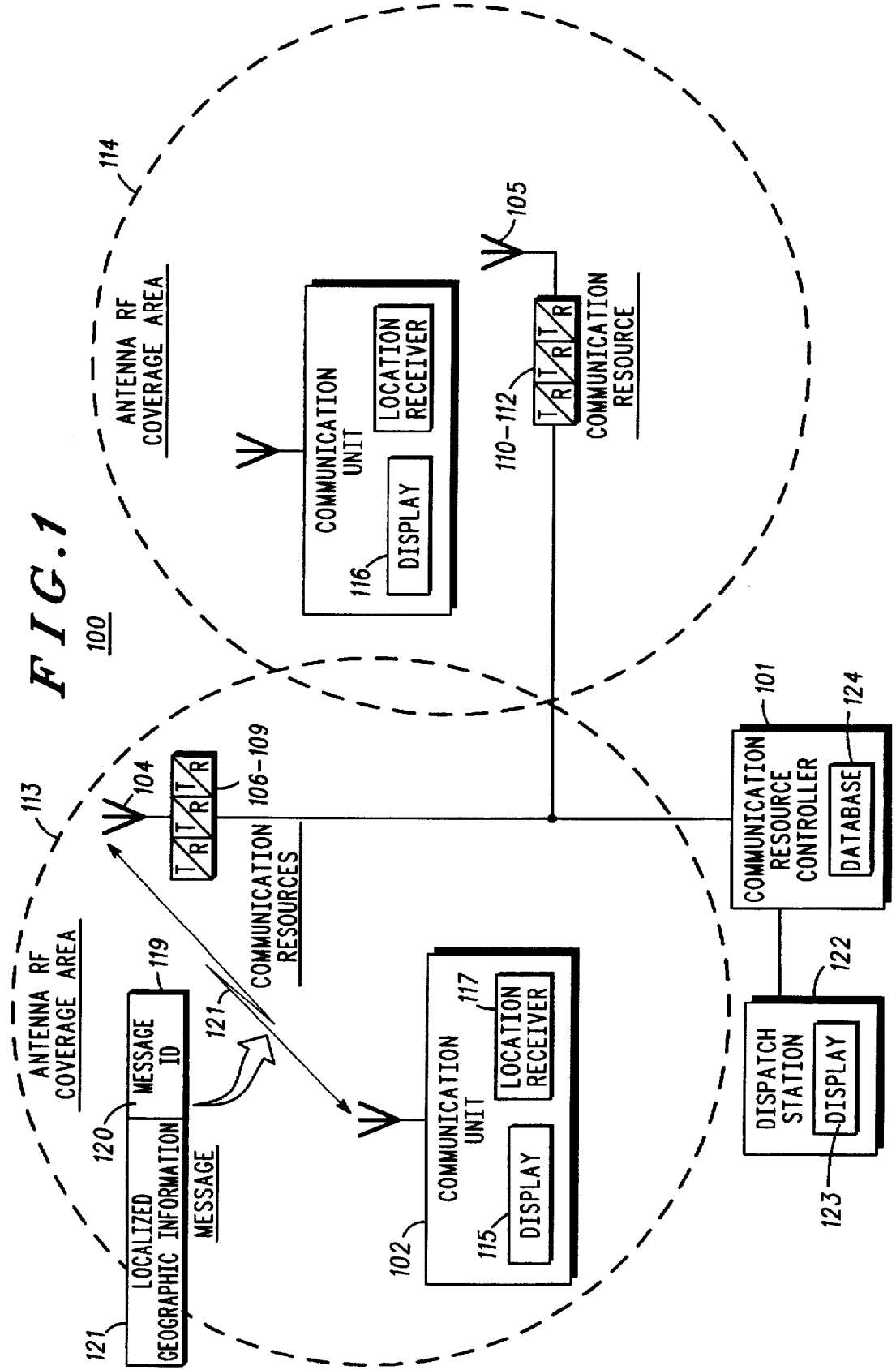

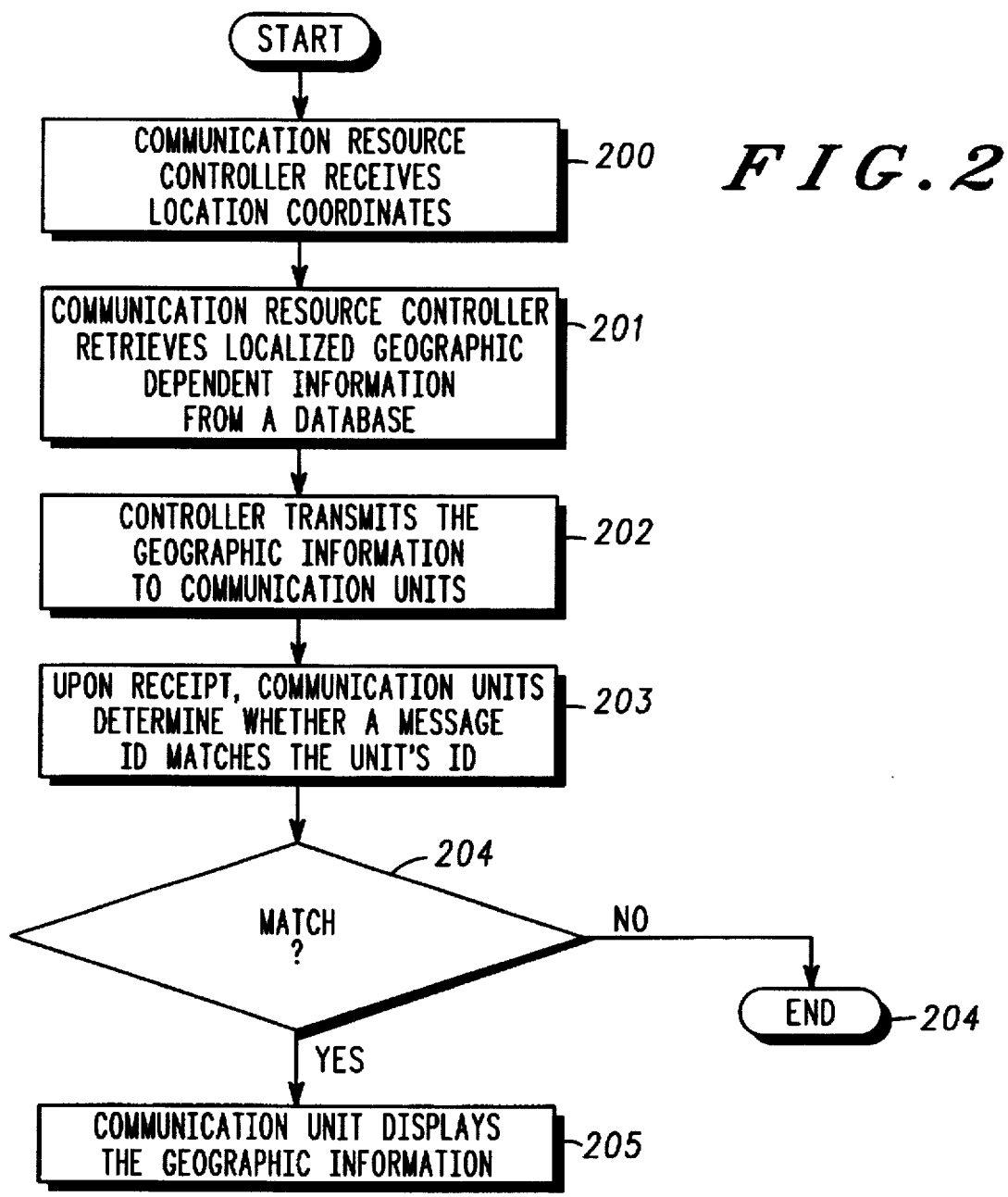

METHOD FOR PROVIDING GEOGRAPHIC DEPENDENT INSTRUCTIONS TO A USER OF A COMMUNICATIONS UNIT

FIELD OF THE INVENTION

This invention relates generally to communication systems and, in particular, to transmitting information related to a geographic area.

BACKGROUND OF THE INVENTION

Communication systems are known to include a communication resource controller, a plurality of communication units, a dispatch station, and antennas that receive a limited number of communication resources. In such communication systems, the communication units communicate with each other via the communication resources where a communication resource may be an RF channel, a pair of RF channels, a TDM slot or any other medium procuring RF signals.

As is also known, communications within a communication system occur when a communication resource has been allocated to a communication unit or to a group of communication units. While the communication resources is allocated to the communication unit or group, voice and/or data may transmitted. In a typical data communication, the data transmitted is requesting information, or responding to a request for information, i.e., a data transmission may be requesting, or responding to, system functions such as status checks, present location, or user defined information. For example, if a communication unit is operated by a police officer, the police officer may request, or be providing, data regarding vehicle information, police record of individuals, etc.

When the operator of a communication unit is requesting data, the request must be conveyed to the communication resource controller. This request is done either verbally, such as "provide me with data regarding the security check list for 123 W. Dover Street", or the request may be communicated via a data entry device. The data entry device may be a keyboard, or key pad on the communication unit. Regardless of how the request was conveyed, upon receipt, the operator of the dispatch station, or dispatcher, must access a data base to retrieve the requested data. This manual process takes a considerable amount of time, up to 15-30 seconds to execute, and is also prone to human errors. In certain emergency situations the time delay or human error can result in devastating results.

Therefore, a need exists for a method that allows information to be automatically transmitted to a communication unit based on the unit's geographic location.

BRIEF DESCRIPTION OF THE DRAWINGS

FIG. 1 illustrates a communication system that incorporates the present invention.

FIG. 2 illustrates a logic diagram that may be used to implement the present invention.

DESCRIPTION OF A PREFERRED EMBODIMENT

Generally the present invention provides a method that allows information to be automatically transmitted to a communication unit based on geographic location. This is accomplished when a communication resource controller receives location coordinates and, based on the location coordinates, retrieves localized geographic information from a database. This information is then transmitted to a communication unit which, upon receipt, determines whether the information is pertinent to the unit. If the information is pertinent, the geographic information is displayed. With such a method, operators of communication units are provided instant information regarding a geographic area without the human errors and time delays of prior art systems.

The present invention can be more fully described with references to FIGS. 1 and 2. FIG. 1 illustrates a communication system 100 that includes a communication resource controller (101), a plurality of communication units (102, 103), a plurality of antennas (104,105) a limited number of communication resources (106–112), and a dispatch station (122). Each of the antennas (104, 105) which may be incorporated into a base station such as Motorola QUANTAR™, has an RF coverage area of (113, 114). Each communication unit (102, 103) includes a display (115, 116) and a location receiver (117, 118). The display (115, 116) may be an LCD type display or a CRT display such that graphic images, text images or both may be displayed. The location receiver (117, 118) may be a global positioning satellite (GPS receiver) that is coupled to a communication processor (not shown).

Within the communication system 100 any of the communication units (102, 103) may initiate a request for geographic information by transmitting the request to the communication resource controller (101). The communication resource controller (101), which may be a Motorola trunking central controller, processes the request and prepares a communication message (119) based on the request. For example, if the request, which includes the geographic coordinates of the communication unit is transmitted, the communication message would include a message ID code (120) and the localized geographic information (121). The localized geographic information could be a variety of things. For example, the localized geographic information could relate to instructions regarding what things need to be inspected. To illustrate, assume that a communication unit is operated by a police officer and the officer has initiated a request for information regarding his/her immediate area. Upon receiving the request and the location of the unit, the communication resource controller retrieves, from a database (124), the localized geographic dependent information which may instruct the officer to check all doors, windows, trash cans, etc., at the area. Alternatively, the localized geographic dependent information may include a floor plan of a particular building.

Regardless of the content of the message (119), the communication resource controller transmits the message (119) via the antennas (104, 105). When a communication unit (102, 103) is within the antenna RF coverage area (113, 114), it will receive the communication message (119). Upon receiving the communication message (119), the units determine whether the message ID code (120) matches the communication units individual or group code. If a match occurs, the communication unit receives the localized geographic dependent information (121) and displays it on its display (115, 116). In addition to the communication units receiving the localized geographic dependent information (121), the dispatch station (122), which may be a CENTRACOM II™ manufactured by Motorola, may also receive and display the information. To display the information, the dispatch station includes a display (123) which may be similar to the displays used in the communication units.

To further illustrate the above, assume that the communication units (102, 103) shown are operated by police officers in the same district. If an officer is operating communication unit (102), and is at a particular geographic location, such as the rear entrance of a particular building, the communication unit transmits in its geographic location, which is determined by the location receiver (117). This information is then transmitted to the communication resource controller (101) which accesses its database (124) to determine the localized geographic dependent information based on the particular geographic coordinates of the communication unit. Having ascertained this information, the communication resource controller transmits the information via the antennas (104, 105). Both the communication units (102, 103), being within the RF coverage area of the antennas, receive the message. Each communication unit then determines whether their ID codes match the message ID code (120). In this case both units have a match, however, based on communication unit (103) location, the operator of that communication unit may elect not to receive the message and thus blank the display. While the operator of communication unit (102) will receive the localized geographic dependent information (121). As illustrated by this example, the localized geographic information is automatically requested and transmitted to the communication unit without delay or human interface. Thus the problems of the prior art are substantially avoided.

FIG. 2 illustrates a logic diagram that may be used to implement the present invention. At step (200), the communication resource controller receives location coordinates. The location coordinates may be received from a communication unit that is located at the location coordinates, from another communication unit requesting information about the location identified by the location coordinates, or from the dispatch station. Regardless of which device transmitted the location coordinates, the communication resource controller retrieves localized geographic dependent information from the database (201). The localized geographic dependent information may be any conceivable data related to the location identified by the geographic coordinates. For example, the localized information may be a floor plan of a building or a security check list. The security check list may be a list instructing a police officer to check all doors, gates, windows, etc. and provide information to their normal state. Thus, if the check reveals a state that is not normal, the police officer reports the condition.

In addition to retrieving the localized geographic dependent information on the location coordinates, the communication resource controller may also retrieve the information based on a directional vector. The directional vector, which may be generated by the location receiver of a communication unit, provides a more specific geographic request. In this embodiment, as the communication unit is pointed in a direction, a directional vector is generated indicating the direction. Thus, the communication resource controller retrieves the localized geographic information based on both the location and the directional vector. As an example, assume that the operator of a communication unit is located at the base of a 12 story building. This position provides the location coordinates. As the operator points the radio at various floors, the directional vector is created. If the operator points to the 4th floor, the communication resource controller may respond by providing the floor plan for the 4th floor only.

Once the communication resource controller retrieves the localized geographic information from the date base, the information is transmitted to the communication units (202). Upon receiving this information, the communication units determine whether their individual unit IDs match the message ID (203). If a match occurs (204), the communication unit displays the geographic information (205). If a match does not occur, the process ends.

The present invention provides a method for automatically retrieving and displaying geographic dependent information. With such a method, the time delay and human error of prior art systems are substantially eliminated. This elimination occurs because the communication units, via their location receiver, transmits their exact location to a communication resource controller. The communication resource controller then does a table look-up to ascertain localized geographic information which is subsequently transmitted to the communication units.

We claim:

1. A method for providing geographic dependent instructions to a user of a communication unit, the method comprising the steps of:

receiving, by a communication resource controller, location coordinates from a communication unit;

based solely on the location coordinates, automatically retrieving, by the communication resource controller, geographic dependent instructions from a database, wherein the geographic dependent instructions are unrelated to movement of the communication unit and instruct a user of at least one communication unit to perform at least one task;

transmitting, by the communication resource controller, the geographic dependent instructions to a plurality of communication units, the plurality of communication units including the communication unit from which the communication resource controller received the location coordinates;

upon receiving the geographic dependent instructions, determining, by each of the plurality of communication units, whether the geographic dependent instructions are pertinent to the respective communication unit; and when the geographic dependent instructions are pertinent to the respective communication unit, displaying, by the respective communication unit, the geographic dependent instructions to a user of the respective communication unit.

2. The method of claim 1, further comprising a step of responding, by the communication unit, to the communication resource controller upon receiving the geographic dependent instructions.

3. The method of claim 1, wherein the step of receiving location coordinates comprises the step of receiving the location coordinates from a second communication unit.

4. The method of claim 1, wherein the geographic dependent instructions comprise a security check list.

5. A method for a communication resource controller to provide geographic dependent instructions to a user of a communication unit, the method comprising the steps of:

receiving location coordinates from a communication unit;

based solely on the location coordinates, automatically retrieving geographic dependent instructions from a database, wherein the geographic dependent instructions are unrelated to movement of the communication unit and instruct a user of at least one communication unit to perform at least one task; and transmitting the geographic dependent instructions to a plurality of communication units, the plurality of communication units including the communication unit from which the communication resource controller received the location coordinates.

6. The method of claim 5, wherein the step of receiving location coordinates further comprises the step of receiving the location coordinates from a second communication unit.

* * * * *